United States Patent [19]

Koseki et al.

[11] Patent Number: 5,289,868

[45] Date of Patent: Mar. 1, 1994

[54] ABSORPTION CHILLER HEATER AND UNIT-TYPE AIR CONDITIONING SYSTEM

[75] Inventors: Yasuo Koseki, Hitachiota; Ryuichi Kaji, Kitaibaraki; Hiroaki Yoda, Tsuchiura; Takashi Nakao, Ibaraki; Tomihisa Ohuchi, Tsukuba; Akira Nishiguchi, Ushiku; Daisuke Hisajima, Ibaraki; Katsuya Ebara, Mito, all of Japan

[73] Assignee: Hitachi, Ltd., Tokyo, Japan

[21] Appl. No.: 866,431

[22] Filed: Apr. 10, 1992

[30] Foreign Application Priority Data

Apr. 10, 1991 [JP] Japan ................... 3-104661

[51] Int. Cl.⁵ .................. F25B 29/00; F25B 15/00
[52] U.S. Cl. ......................... 165/14; 165/22; 165/50; 165/63; 62/148; 62/185; 62/201; 62/476; 236/1 B
[58] Field of Search .............. 62/476, 201, 148, 185; 165/62, 22, 50, 63; 236/1 B

[56] References Cited

U.S. PATENT DOCUMENTS

| | | | |
|---|---|---|---|
| 3,314,246 | 4/1967 | Hopkins et al. | 62/476 |
| 3,593,780 | 7/1971 | Donnelly | 165/50 |
| 3,837,174 | 9/1974 | Miyagi et al. | 62/476 |
| 4,429,541 | 2/1984 | Kamejima et al. | 62/201 |
| 4,493,192 | 1/1985 | Hibino et al. | 62/476 |
| 4,498,307 | 2/1985 | Hibino et al. | 62/476 |
| 4,894,998 | 1/1990 | Kaneko et al. | 62/476 |
| 5,142,877 | 9/1992 | Shimizu | 165/22 |

FOREIGN PATENT DOCUMENTS

| | | | |
|---|---|---|---|
| 0067146 | 6/1978 | Japan | 62/476 |
| 0102002 | 8/1980 | Japan | 62/201 |
| 62-194159 | 8/1987 | Japan | . |
| 0203857 | 8/1989 | Japan | 165/62 |
| 0314869 | 12/1989 | Japan | 62/476 |
| 2-56578 | 2/1990 | Japan | . |
| 0183770 | 7/1990 | Japan | 62/476 |

OTHER PUBLICATIONS

Whitlow et al, An Improved Absorption Refrigeration Cycle Gas Age Oct. 30, 1958 pp. 19–22.

*Primary Examiner*—John K. Ford
*Attorney, Agent, or Firm*—Antonelli, Terry, Stout & Kraus

[57] ABSTRACT

An unit-type air conditioning system is provided to enable low-load operation of an absorption chiller heater, to thereby improve the load responsiveness, and to use such a chiller heater as an outdoor unit. A plurality of burners are provided in a high temperature generator of the absorption chiller heater, thereby enabling the low-load operation. A refrigerant return valve is provided so as to speed up the stop operation. Flow rates of pumps are controlled in accordance with detected values of temperatures in the chiller heater and a load change, thus improving the load responsiveness. Further, in the air conditioning system with this chiller heater serving as an outdoor unit, required operation prediction is performed on the basis of outer signals from load units and the like, and prediction control according to its result is conducted, further improving the load responsiveness.

9 Claims, 8 Drawing Sheets

ABSORPTION CHILLER HEATER AND UNIT-TYPE AIR CONDITIONING SYSTEM

BACKGROUND OF THE INVENTION

The present invention relates to an absorption chiller heater and an unit-type air conditioning system which includes the absorption chiller heater so that the start and stop of cooling and heating operation can be individually performed from load units.

DESCRIPTION OF PRIOR ART

An unit-type air conditioning system having air conditioning equipments provided in load units is very advantageous in a place like an office building, particularly in an office building like, where cooling and heating demands of load units vary individually. However, since it is necessary to install a large number of small capacity air conditioning equipment, the system requires a large installation space, and it is also uneconomical. This problem can be solved by a centralized (concentrated) air conditioning system in which a refrigerant such as Freon and chilled/hot water are supplied to load units (e.g., fan coil units) from an outdoor unit of a large-capacity electric refrigerator or an absorption chiller heater in order to perform cooling/heating operations of the load units individually. However, the system involves some operational problems, for example, the start and stop can not be freely controlled from the load units. Further, it requires an exclusive operator for maintenance of the outdoor unit. For such reasons, this system is suitable for air conditioning of a building, such as a department store, where the cooling and heating loads do not change much in accordance with places and time.

A conventional system which can perform individual air conditioning and is improved in economic effectiveness and space efficiency is disclosed in, for example, Japanese Patent Unexamined Publication No. 62-194159. In such a conventional system, a large-capacity electric refrigerator is provided as an outdoor unit from which a refrigerant such as Freon is supplied to load units (indoor units), so that cooling/heating operations of the load units can be conducted individually, and that the start, stop and so forth of the outdoor unit can be performed from the load units. An unit-type air conditioning systems of this kind (hereinafter referred to as multiple-type air conditioning systems) are produced as commercial goods, and the market for them is expanding.

The above-described multiple-type air conditioning system can perform individual air conditioning, and also, it has concentrated equipment which can be installed economically. Consequently, the system can be applied to air conditioning of various types of buildings. In this system, however, the electrically driven refrigerator whose refrigerant is Freon gas is used as the outdoor unit, which results in problems of an increase in operational costs and destruction of the environment. If an absorption chiller heater disclosed in, for example, Japanese Patent Unexamined Publication No. 2-56578 is employed as an outdoor unit in place of the electric refrigerator, there can be realized a multiple-type absorption air conditioning system free from the above-mentioned problems. However, the absorption chiller heater involves other problems, for example, in comparison with the electric refrigerator, mainly thermal capacity of the equipment is so large that it is difficult to respond to a drastic load change; low-load operation is difficult; the start and stop operation takes a long time because the thermal capacity is large and because dilution operation is required; and since chilled/hot water is used for transportation of sensible heat (utilizing temperature changes), the speed of heat transportation is lower than that of transportation of latent heat by use of Freon (utilizing evaporation heat), thereby causing a heat transportation delay. The absorption chiller heater has a drawback in its load change responding capability which is an essential condition for an outdoor unit of a multiple-type air conditioning system.

It is therefore an object of the present invention to provide an absorption chiller heater with the load change responding capability which is required for a multiple-type air conditioning system, and an unit-type air conditioning system in which this absorption chiller heater is used as an outdoor unit.

SUMMARY OF THE INVENTION

An absorption chiller heater according to the invention is provided with load responsive type control means for performing cooling and heating operation control in accordance with a load.

Moreover, for the purpose of the control by the above-mentioned control means, the absorption chiller heater according to the invention has structural features such that it is provided with a plurality of (multiple) burners, to thereby control burning by changing the number of burners and a fuel supply rate in accordance with a load. In response to a change in a burning amount, inverter (rotational speed) control or the like of a pump is conducted to change a circulation amount of a solution, and regulation of an opening degree of a valve is conducted to change a flow rate of cooling water and in response to a change in the burning amount, inverter (rotational speed) control or the like of a pump is conducted to change a spray amount of a refrigerant. Temperatures of component portions of the chiller heater are detected to obtain and control concentrations of the solution. A refrigerant return line is provided to arrange not a refrigerant of an evaporator but refrigerants from a condenser and a low temperature generator to be returned to an absorber at the time of the operation stop. Since the refrigerant of the evaporator is not used at the time of the stop, the evaporator is designed to store the refrigerant for spray. The chiller heater includes a mechanism in which outer signals can be inputted, and a mechanism for controlling the chiller heater with priority in response to the signals.

Furthermore a unit-type air conditioning system according to the invention comprises load terminals, cooling and heating air generators (which are unnecessary in some cases), and the absorption chiller heater of the invention as an outdoor unit, and has structural features such that each unit includes a control mechanism and that information, such as room temperatures at the load terminals, ON-OFF or cooling and heating change signals, and so forth, is constantly sent to the cooling and heating air exchangers and the outdoor unit, and information about the cooling and heating air exchangers is sent to the outdoor unit, so as to perform prediction control of the outdoor unit and the cooling and heating air exchangers.

With the absorption chiller heater, load-responsive operation control is realized. More specifically, since a plurality of (multiple) burners are provided to thereby control burning by changing the number of burners and a fuel supply rate in accordance with a load, steady burning can be performed even with a low cooling and heating load, thus enabling low-load operation. In response to a change in a burning amount, a circulation amount of a solution and a flow rate of cooling water are changed to prevent the heat efficiency (COP) from deteriorating, and, in response to a change in the burning amount, a spray amount of a refrigerant is changed to improve the load responsiveness. Although it is important to control concentrations of solutions in the chiller heater because they change in a complex manner in response to a cooling and heating load change, direct measurement of the concentrations is difficult, and therefore, in the invention, temperature differences between the absorber and the condenser and between a high temperature generator and the condenser are measured to conduct on-line estimation of the solution concentrations, thereby performing the concentration detection highly accurately and preventing the trouble of the solution crystallization. The refrigerant return line is provided to arrange refrigerants from the condenser and the low temperature generator to be returned to the absorber at the time of the operation stop so as to dilute the solution rapidly, and also, by stopping refrigerant spray and increasing a circulation amount of the solution, time (for dilution) until the stop is reduced. The refrigerant stored in the evaporator during the stop can be used to begin refrigerant spray immediately at the time of the operation start, thus decreasing time required for the operation start. Signals from the load units and the like are directly inputted, and prediction control is carried out by use of the signals, thereby greatly improving the load responsiveness which has been a disadvantage of an absorption chiller heater.

In relation to operation control of the unit (multiple)-type air conditioning system with the absorption chiller heater, which comprises the load terminals, the cooling and heating air exchangers (which are unnecessary in some cases), and the outdoor unit. Each unit includes a control mechanism so as to simplify operation and control mechanisms and to enable individual manufacture. Information such as room temperatures at the load terminals, ON-OFF or cooling and heating change signals, and so forth, is constantly sent to the cooling and heating air exchangers (which are unnecessary in some cases) and the outdoor unit, and information about the cooling and heating air exchangers is sent to the outdoor unit, in order to perform prediction control of the outdoor unit and the cooling and heating air exchangers, thus greatly improving the load responsiveness which has been a disadvantage of an absorption chiller heater and a heat transportation system with chilled/hot water. As described above, the invention enables an absorption chiller heater to respond to a load change, to thereby realize an unit-type absorption air conditioning system with such a chiller heater.

DETAILED DESCRIPTION OF THE INVENTION

The present invention will be hereinafter described in detail on the basis of embodiments with reference to the attached drawings.

Figure 1:
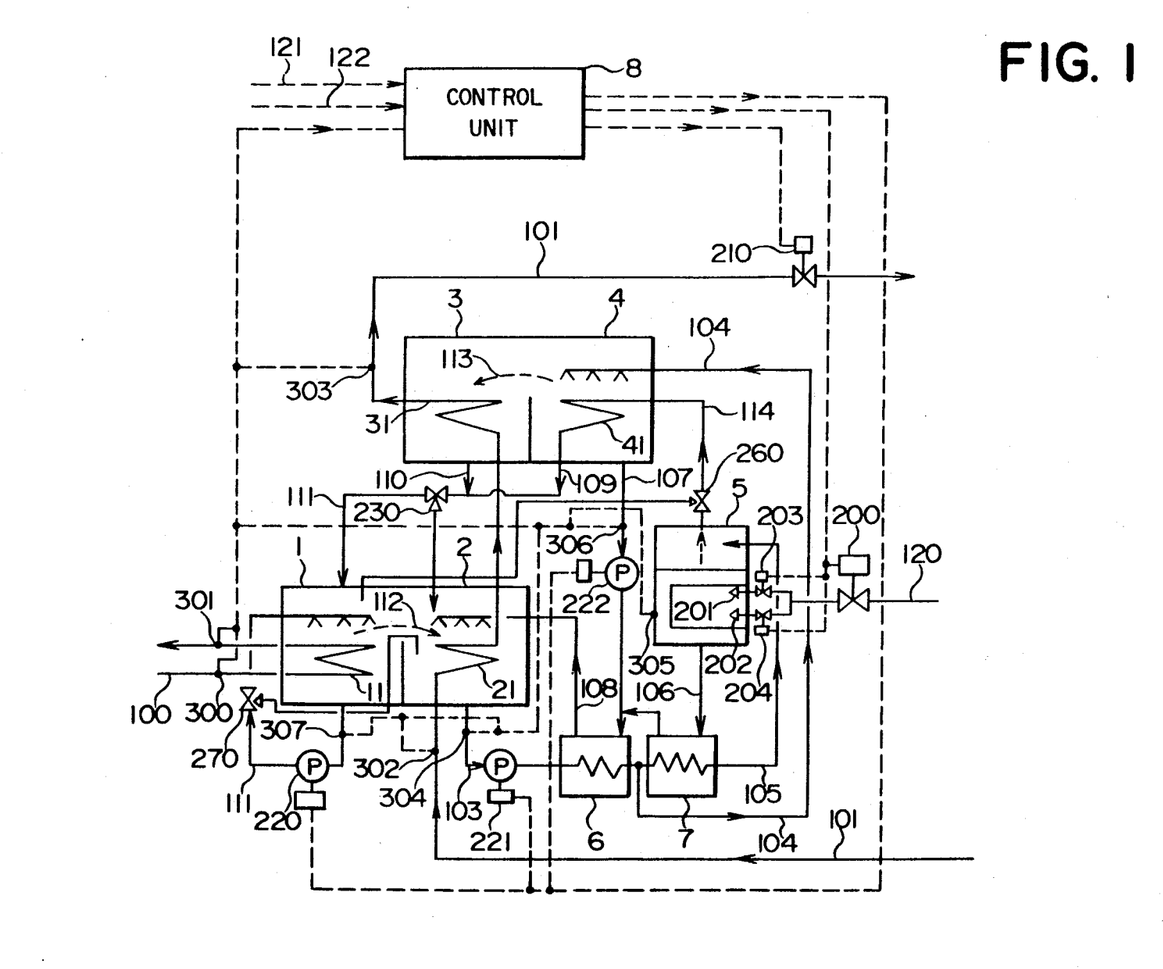
FIG. 1 is a schematic view of one embodiment of an absorption chiller heater according to the present invention.

As shown in FIG. 1 shows one embodiment of an absorption chiller heater according to the invention, which is a parallel-flow double-effect type, comprises an evaporator 1, an absorber 2, a condenser 3, a low temperature generator 4, a high temperature generator 5, a low-temperature heat exchanger 6, a high-temperature heat exchanger 7, a control unit 8, and so forth.

Chilled water 100 flows inside a heat transfer pipe 11 in the evaporator 1, whereas, water 111, serving as a refrigerant, is sprinkled over the outside of the heat transfer pipe 11 by a refrigerant spray pump 220 so that, when it is evaporated, the chilled water 100 inside the pipe is refrigerated. This chilled water 100 causes water vapor 112 to be generated outside the heat transfer pipe 11 for cooling operation, and it is absorbed by a concentrated solution 108 sprinkled over a heat transfer pipe 21 in the absorber 2. Heat of absorption thus generated is cooled by cooling water 101 inside the pipe. A solution 103, diluted as a result of absorption of the water vapor, is fed into the low-temperature heat exchanger 6 by a solution pump 221. After it is heated in heat exchanger 6, a part of the solution 104 is supplied to the low temperature generator 4, and the rest of the solution 105 is further heated in the high-temperature heat exchanger 7 and supplied to the high temperature generator 5. In the high temperature generator 5, fuel 120, regulated by a fuel regulation valve 200, is injected and burned from a plurality of (two, in this embodiment) burners 201, 202, so that the solution is heated to evaporate and separate water serving as a refrigerant from the solution, thereby concentrating the solution. Water vapor 114 thus generated is fed into the low temperature generator 4 and used as a heat source for heating and concentrating the solution. After the solution is condensed, the solution is returned, as a refrigerant 109, to the evaporator 1 by way of a refrigerant return valve 230. Water vapor 113 generated from the solution in the low temperature generator 4 is refrigerated by the cooling water 101 flowing inside a heat transfer pipe 31 in the condenser 3, and condensed outside the pipe. Then, it is returned, as a refrigerant 110, to the evaporator 1 by way of the refrigerant return valve 230. A solution 106, concentrated in the high temperature generator 5, is cooled in the high-temperature heat exchanger 7. After that, the solution 106 is mixed with a solution 107 supplied from the low temperature generator 4 by a pump 222, and the mixed solution 106, 107 is further cooled in the low-temperature heat exchanger and then supplied to the absorber 2.

Next, a heating cycle will be explained. Cooling and heating change valves 260, 270 are operated to feed the water vapor 114 generated in the high temperature generator 5 into the evaporator 1 not via the low temperature generator 4 but by way of the cooling and heating change valve 260, so that it is condensed on the outer surface of the heat transfer pipe 11, thereby heating hot water 100 inside the pipe.

By the refrigerant spray pump 220, the condensed refrigerant 111 is supplied via the cooling and heating change valve 270 into the absorber 2 where the condensed refrigerant 111 is mixed with and dilutes a solution 108 from the high temperature generator 5 and the low temperature generator 4. Then, it is supplied to the high temperature generator 5 and the low temperature generator 4 again by the solution pump 221. In this cycle, the cooling water 101 does not flow, and heat conversion is not conducted in the absorber 2 and the condenser 3. Heat from the high temperature generator 5 is directly inputted into the evaporator 1 in the form of water vapor, to thereby obtain hot water 100 for heating operation.

The above-described embodiment has the following structural and functional characteristics. A plurality of burners 201, 202 and a plurality of secondary fuel valves (or regulation valves) 203, 204 are provided in the high temperature generator so that burning is effected reliably even when the load is low. Inverter (rotational speed) control of the solution pumps 221, 222 is conducted in response to a change of a cooling and heating load (a burning amount), or the flow rate of cooling water is controlled by a flow rate control valve 210, to thereby prevent the heat efficiency (COP) from deteriorating due to a load change. When the cooling and heating load (or the burning amount) is decreased (increased), inverter (rotational speed) control or such control of the refrigerant spray pump 220 is conducted to decrease (increase) the amount of spray, so as to improve the load responsiveness. Temperature sensors 307, 304, 305, 306, 302, 303 of the refrigerant, solution and cooling water are installed to monitor concentrations of the solution constantly and to prevent crystallization trouble of the solution owing to excessive concentration as a result of a sudden load change, and freezing trouble of the refrigerant due to a pressure drop in the evaporator. The refrigerant return valve 230 is provided so that the solution can be rapidly diluted at the time of the operation stop, thus lessening the operation starting time. Other than signals supplied from an outdoor unit 1000 (FIG. 4), start or cooling and heating change signal information 121 and information 122 for prediction control from the outside can be inputted into the control unit 8. Also, mechanisms for priority control of the absorption chiller heater by use of such information are provided so that the prediction control can improve the load responsiveness.

Figure 2:
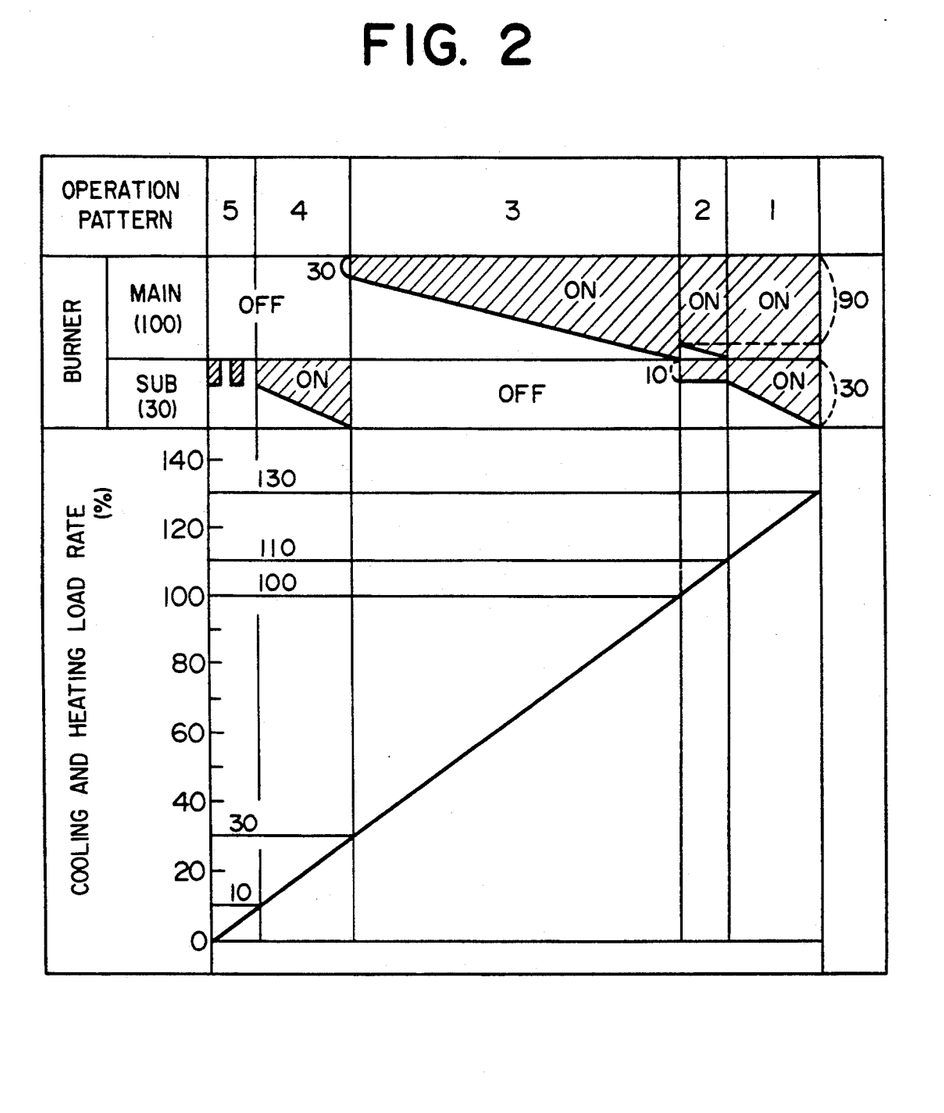
FIG. 2 is a diagram illustrative of a burning control method of the absorption chiller heater shown in FIG. 1.

FIG. 2 shows characteristics of cooling and heating load changes when a main burner 201 whose capacity is 100 and a sub-burner 202 whose capacity is 30 are used as the two burners 201, 202. The abscissa indicates an operational condition of the burners which is divided into five operation patterns. The ordinate indicates a cooling and heating load rate. In general, a capability variable range of a single burner is from the maximum capability (100%) to about its 30%. Therefore, when the cooling and heating load is 30% or less of the burner capability, operation can not be carried out by a single burner as in the conventional apparatus, and such a single burner is insufficient for an outdoor unit of a multiple-type system for individual air conditioning. With the plural-burner arrangement as shown in FIG. 2, only the main burner 201 is used with substantially 100% capability at the load of 100%. Until the load of about 30% (Pattern 3), the capability of the main burner 201 is changed (to 30%). Next, until the load of 10% (Pattern 4), the capability of the sub-burner 202 alone is changed (to 30%). After that (Pattern 5), ON-OFF operation of the sub-burner 202 is performed. Also, usually, the heating capability of an absorption chiller heater, in which heat efficiency is lower, is accordingly smaller than the cooling capability, and consequently, the cooling and heating load rate exceeds 100% in some cases of heating operation. Such a situation can be likewise dealt with in this embodiment. More specifically, until the load of 110% (Pattern 2), the sub-burner 202 covers the load of 10% (constantly), and the main burner 201 covers the rest by changing its capability. Until the load of 130% (Pattern 1), the main burner 201 is maintained constantly at substantially 100% capability, and the sub-burner 202 covers the rest by changing its capability. Further, if a drastic change is caused in the load in the range of 30% to 110% (Patterns 2 and 3), ON-OFF operation of the sub-burner 202 can be conducted to deal with the situation. As described above, by use of a plurality of burners, the load variable range of the absorption chiller heater can be widened, and also, the load responsiveness can be improved. Therefore, this embodiment is suitable for an outdoor unit of an unit-type absorption air conditioning system.

Figure 3:
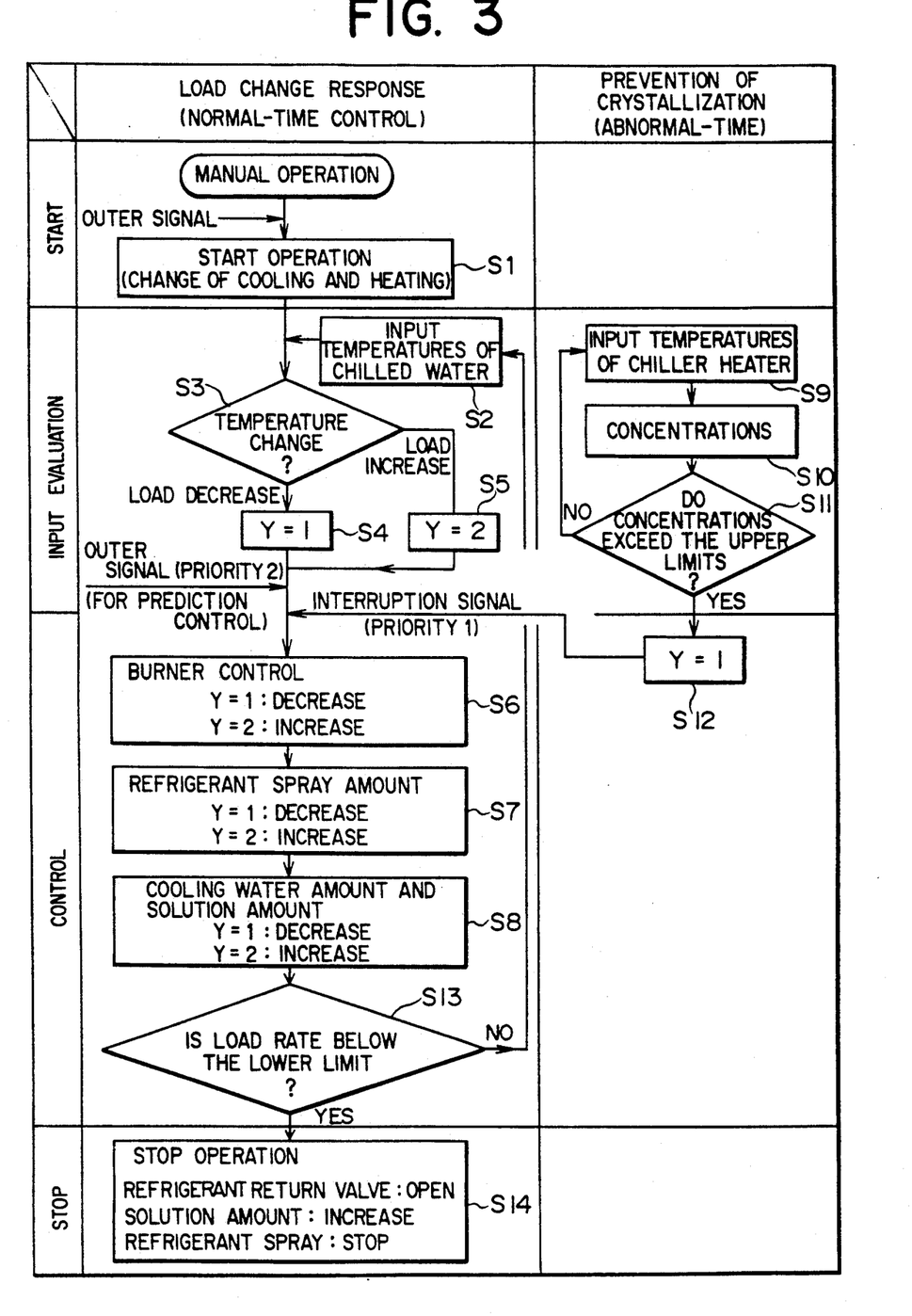
FIG. 3 is a diagram illustrative of an operation control method of the absorption chiller heater shown in FIG. 1.

Next, an operation control method of the absorption chiller heater of FIG. 1 will be explained on the basis of the embodiment shown in FIG. 3. The start of the absorption chiller heater is performed in response to a step S1 of the control unit 8 when operation start or change of cooling and heating is commanded by manual operation or an outer signal 121. This step is a normal start or change operation. After the start, temperatures of chilled/hot water at the inlet and the outlet are detected by the temperature sensors 300, 301 and inputted into the control unit 8 at a step S2. A difference between these temperatures is evaluated at a step S3. When the outlet temperature is higher than the inlet temperature by a predetermined value or more, it is judged as a load increase, and a parameter Y is set at 2 (a step S5). Otherwise, the parameter Y is set at 1 (a step S4). Then, steps S6 and S7 are carried out in accordance with this value of Y. In the case of Y=1 (Y=2), burning amounts of the burners 201, 202 are decreased (increased) in dependence upon operation patterns illustrated in FIG. 2 by regulating the fuel regulation valve 200 and the secondary fuel valves 203, 204, and a refrigerant spray amount is decreased (increased) by controlling the rotational speed of the refrigerant spray pump 220, so as to change the temperature of the chilled/hot water and to produce a cooling and heating output corresponding to the load. Further, at a step S8, an opening degree of the flow rate regulation valve 210 is controlled to decrease (increase) the flow rate of cooling water, and also, rotational speeds of the pumps 221, 222 are controlled to decrease (increase) the solution circulation amount. Thus, the heat efficiency can be prevented from deteriorating.

In addition to the control at the time of normal operation described above, this embodiment prevents crystallization of the solution due to excessive concentration of the solution in the following manner. More specifically, because it is difficult to measure concentrations of the solution directly and because the measurement of a pressure inside the chiller heater in a vacuum has low accuracy, there is employed a method in which the concentrations of the solution are presumed by measuring the temperatures. Consequently, in steps S9 and S10 of FIG. 3, a concentration of the solution after it is concentrated is presumed from a difference between a temperature 305 of the high temperature generator and a temperature 303 of cooling water at the outlet of the condenser, and a concentration of the solution after it is diluted is presumed from a difference between a temperature 304 of the absorber and a temperature 307 of the evaporator. When these concentrations are higher than the upper limit value for preventing the crystallization, the parameter Y is-set at 1 (steps S11 and S12), and control corresponding to the step S6 and the following steps is conducted with Y=1 irrespective of the value set in the step S4, S5. In this manner, solution crystallization can be prevented without fail. Further, if there is inputted a control signal (Y=1 or 2) in which the load condition is predicted from an outer signal 122 in a manner to be described below, the step S6 and the following steps are carried out with the priority next to that of the above-mentioned steps S11 and S12, in order to prevent a time lag due to a thermal capacity and so forth of the air conditioning system and to improve the load responsiveness.

At the time of the stop of the absorption chiller heater, it is necessary to dilute the solution to a concentration at which the solution will not be crystallized. At a step S13, a stop signal is judged from that the load or the like is not more than a predetermined value. At a step S14, the refrigerant return valve 230 is first opened to feed the refrigerants 109, 110 from the low temperature generator 4 and the condenser 3 directly into the absorber 2, thereby rapidly diluting the solution by mixing with it. The circulation amount of the solution is increased by controlling the rotational speeds or the like of the solution pumps 221, 222, and the solution remaining in places except the absorber 2 is returned to the absorber 2 so as to uniformly dilute the solution, thus largely lessening the dilution time. Besides, if the refrigerant 111 is sprayed over the heat transfer pipe 11 in the evaporator 1 during the stop operation, the cooling function is continued due to the evaporation. Consequently, the refrigerant spray pump 230 is stopped, and thus, the cooling function is stopped at the same time as the stop.

Figure 4:
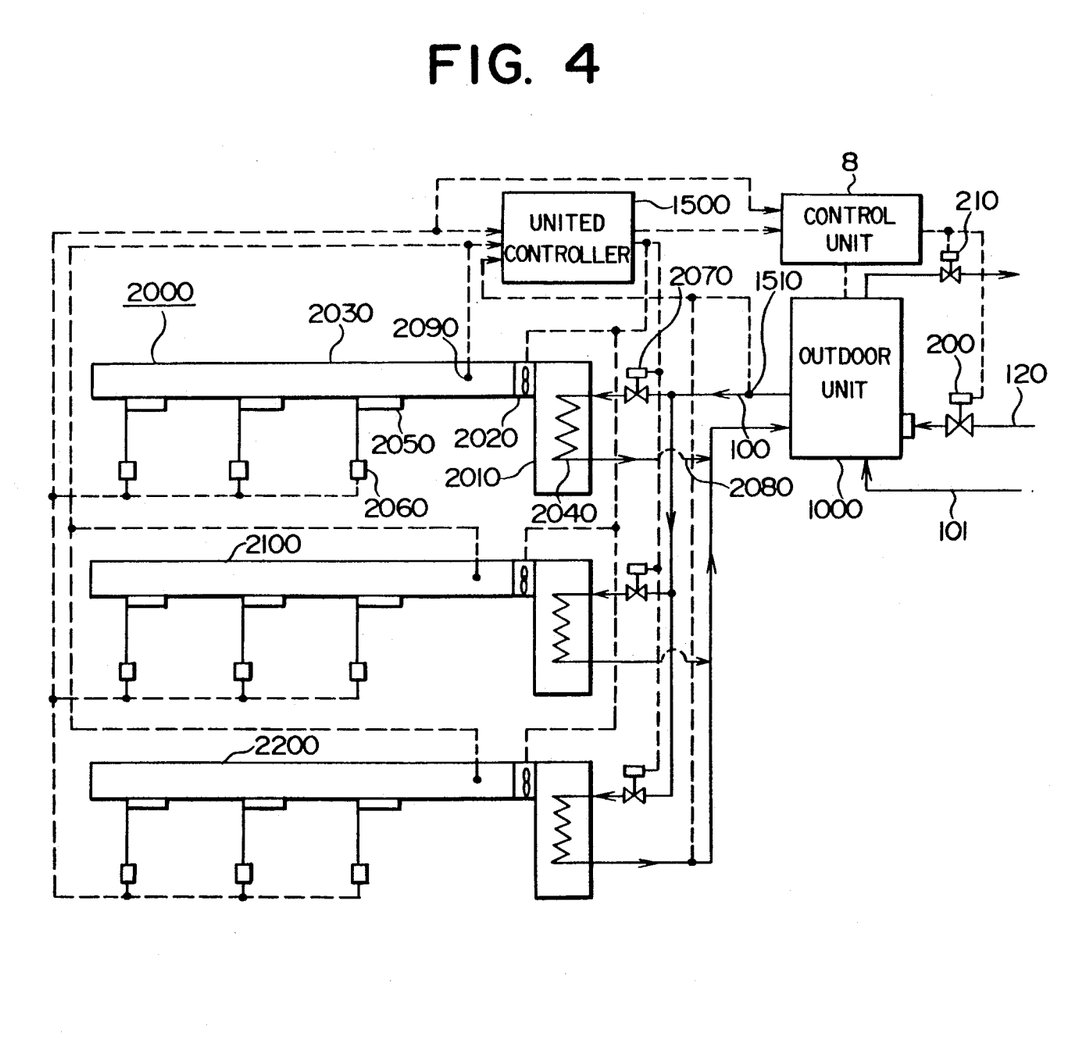
FIG. 4 is a schematic view of one embodiment of a unit-type air conditioning system according to the invention.

The operation and operation control methods of the absorption chiller heater shown in FIG. 1 have been described above. FIG. 4 illustrates one embodiment of an unit-type air conditioning system in which this absorption chiller heater is used as an outdoor unit 1000. This system comprises a plurality of secondary units 2000, 2100, 2200, a united controller 1500 for controlling these units, and the like. The unit 2000 (as well as the other units) includes a cooling and heating air exchanger 2010, an air duct 2030, a plurality of air capacity regulators 2050, and a plurality of operation units 2060. A chilled and hot water heat exchanger 2040, a water flow control valve 2070, and a fan 2020 are provided in the cooling and heating air exchanger 2010. Each of the operation units 2060 performs room temperature control by regulating an opening degree of an air capacity regulation valve in the air capacity regulator 2050 in accordance with a temperature in a room in which this operation unit is installed, and simultaneously, it also transmits three pieces of information, i.e., the room temperature, the opening degree of the air capacity regulation valve, and a start signal, to the united controller 1500. In the cooling and heating air generator 2010, heat of chilled/hot water, which is supplied from the outdoor unit 1000 by the heat exchanger 2040, is transmitted to the air, and the air is passed through the air duct 2030 by the fan 2020 and blown into the rooms from the air capacity regulators 2050 of the respective load units.

Figure 5:
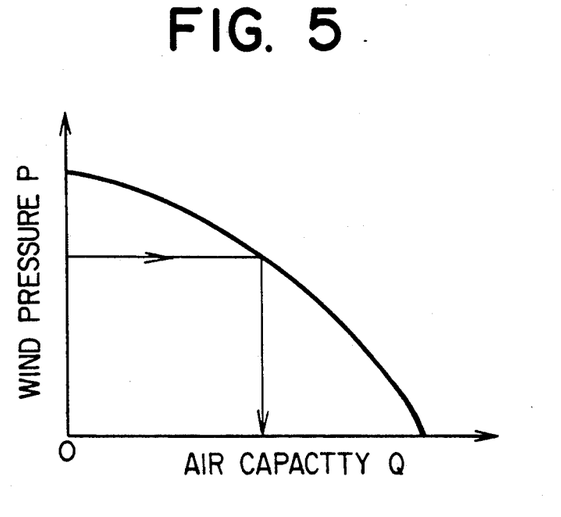
FIG. 5 is a graphical illustration of a characteristic of a fan.
Figure 6:
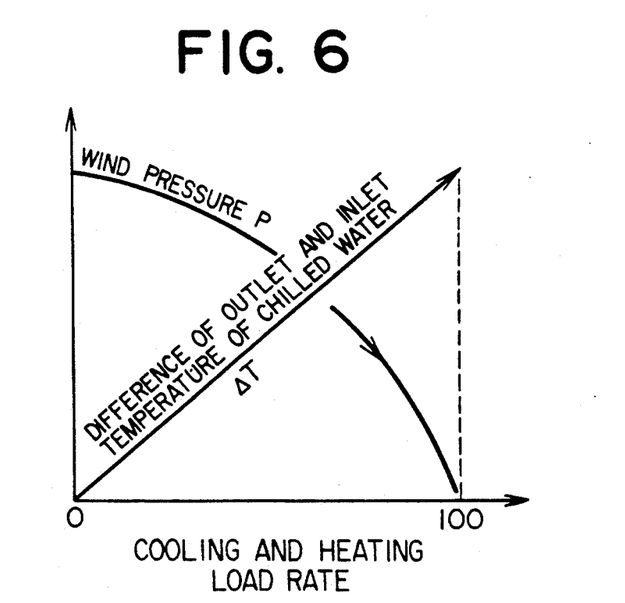
FIG. 6 is a graphical illustration of a load characteristic of blower sections.
Figure 7:
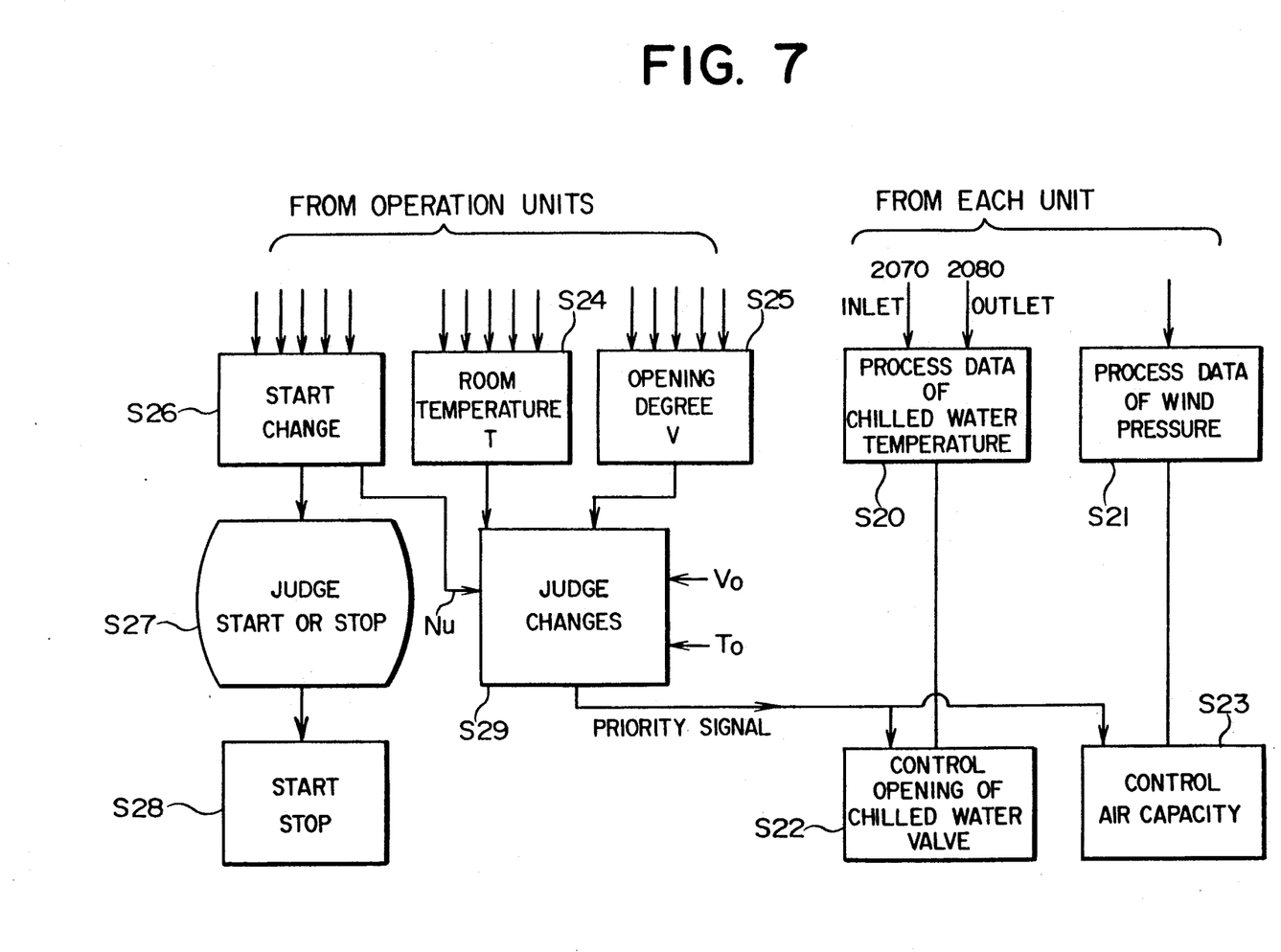
FIG. 7 is a schematic view of an operation control method of cooling and heating air exchangers of the system shown in FIG. 4.

FIG. 7 illustrates control of the unit 2000 (as well as the other units) by the united controller 1500. First, a cooling and heating load of the unit 2000 is detected in the following manner with a difference between an inlet temperature 2070 and an outlet temperature 2080 of chilled/hot water, and a wind pressure 2090 in the duct. An air capacity characteristic of the fan is shown in FIG. 5. The air capacity tends to increase as the air resistance (wind pressure) becomes lower, and the characteristic is determined by the fan. Therefore, the air capacity can be obtained by measuring the wind pressure. Since the cooling and heating load of each unit is controlled by the air capacity regulators 2050 in the respective load units, the air capacity increases when the load is higher, and the inlet and outlet temperature difference of chilled/hot water becomes larger when the flow rate of chilled/hot water is constant. This is depicted in the graphical illustration of FIG. 6. When the cooling and heating load increases, the wind pressure is reduced and the inlet and outlet temperature difference becomes larger. Consequently, by detecting the wind pressure and the inlet and outlet temperature difference, the cooling and heating load of each unit can be presumed. Referring again to FIG. 7, at a step S20, the inlet temperature 2070 and the outlet temperature 2080 of chilled/hot water are inputted and processed, and when the temperature difference is small (large), a chilled water valve 2070 for flow rate control is opened (closed) at a step S22. A wind pressure 2090 is inputted at a step S21, and when it is high (low), the rotational speed of the fan 2020 is decreased (increased) at a step S23. Thus, automatic control of each unit is performed. Further, the information about a temperature T and a valve opening degree V is sent from each of the operation units 2060 (plural in most cases) which are the load units, as described before, so that it is inputted at steps S24 and S25. At a step S26, the start signal or the like similarly sent from each of the operation units is inputted. Subsequently, at a step S29, the number $N_U$ of start signals which are inputted at the moment is obtained, and the inputted temperatures T in the respective rooms, the inputted valve opening degrees V of the respective air capacity regulators 2050, and their predetermined reference values $T_0$ and $V_0$ are used to obtain $S_1$ and $S_2$ of values of the rooms (load units) from the following equations:

$$S_1 = \Sigma(T - T_0) \quad (1)$$

$$S_2 = \Sigma(V - V_0) \quad (2)$$

Moreover, with a total number $N_{U0}$ of the load units, a course number rate n, a temperature change rate t, and a valve opening change rate v are derived from equations:

$$n = N_U/N_{U0} \tag{3}$$

$$t = \Sigma(T-T_0)/N_U = S_1/N_U \tag{4}$$

$$v = \Sigma(V-V_0)/N_U = S_2/N_U \tag{5}$$

Any of these values of n, t and v means that the load sum is greater as it is greater in the positive direction. Therefore, from their time change rates, it can be predicted whether the flow rate of chilled/hot water and the air capacity will be increased or decreased. Consequently, time change rates of the respective values n, t and v are obtained, and in accordance with these rates, the opening control of the valve 2070 and the rotational speed control of the fan 2020 in the steps S22 and S23 are conducted prior to the results of the above-mentioned steps S20 and S21. With this prediction control, heat transportation delays in the air duct 2030 and the cooling and heating air exchanger 2010 and time lags due to thermal capacities can be prevented to improve the load responsiveness. Further, the cooling and heating air exchanger 2010 judges the start when one or more start signals are inputted from the operation units 2060 in each unit, and it judges the stop when stop signals are inputted from all the operation units 2060 in the unit (or when no start signal is inputted) (a step S27). Then, when its result or a cooling and heating change signal is inputted, the start/stop is effected according to the input in a step S28.

Figure 8:
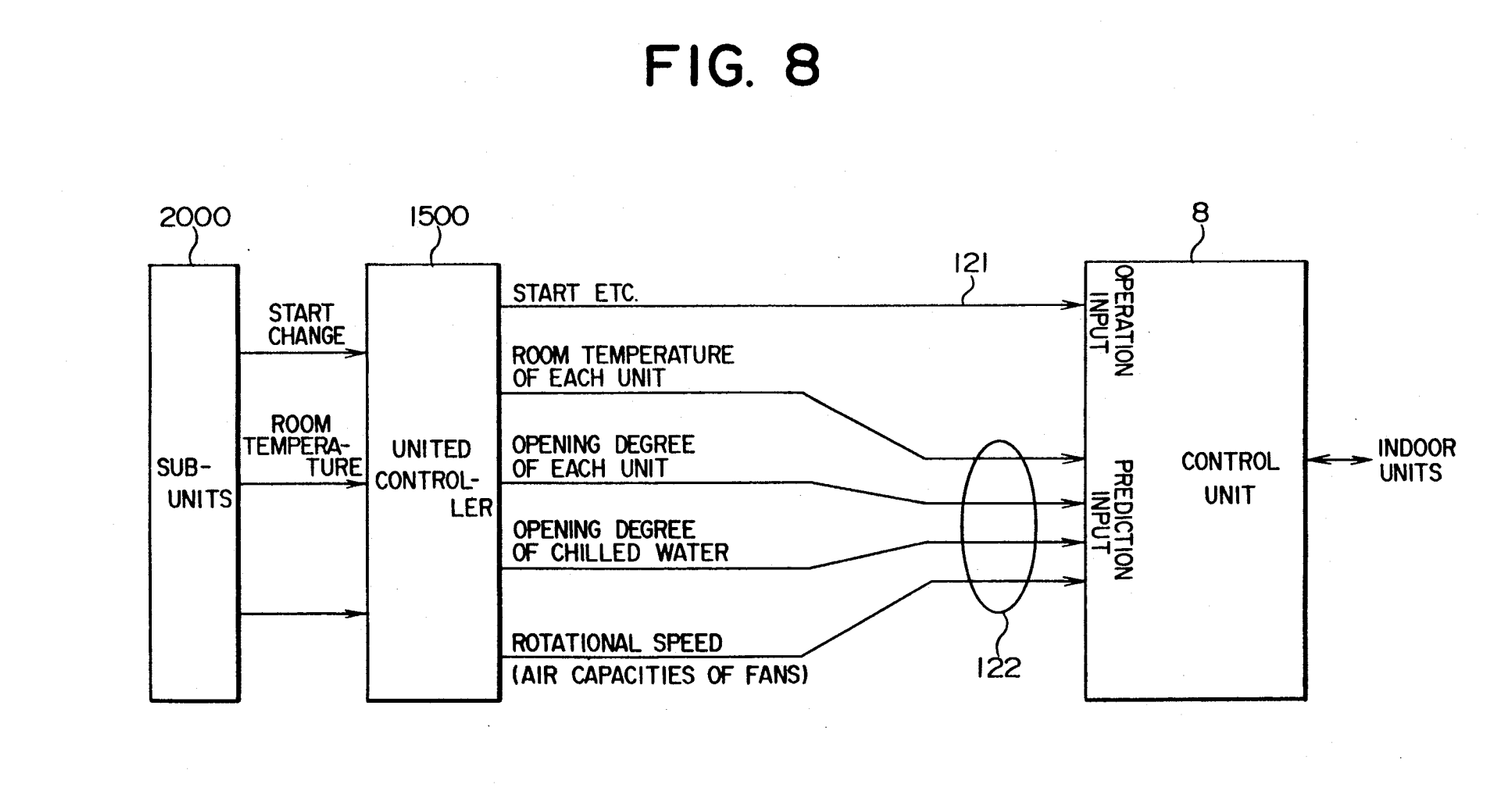
FIG. 8 is a schematic view of an operation control method of the absorption chiller heater of the system of FIG. 4.

An operation control method of the outdoor unit 1000 in the unit-type air conditioning system shown in FIG. 4 will now be explained with reference to FIG. 8. Control based on the temperatures of chilled/hot water inside the outdoor unit 1000 itself or such matters has already been described referring to FIG. 3. Therefore, control by use of the outer signals 121, 122 will be described here. First, signals from the operation units 2060 in the secondary units 2000, 2100, 2200 and so forth of FIG. 4, which command the start/stop and the change of cooling and heating, are inputted as the outer signals 121 into the control unit 8 of the outdoor unit via the united controller 1500 along with detected information such as room temperatures and valve opening degrees in the secondary units. In response to this input, the control unit 8 functions in the manner described with reference to FIG. 3, and control corresponding to the contents of the signals is carried out. At this stage, in the case where the outer signals are start signals, the start is judged even if one of the plural operation units 2060 sends out a start signal, and in the case where the outer signals are stop signals, the stop is judged when signals from all the operation units 2060 are stop signals. Also, the room temperatures T and the valve opening degrees V indicated in FIG. 7 with which the operation of the united controller 1500 has been described, and valve opening degrees B, air capacities Q and so on which are controlled by them, are inputted as the outer signals 122 from the respective secondary units and processed in substantially the same manner as the united controller 1500 so as to predict a load change, thereby performing the prediction control of the outdoor unit 1000. Although the load responsiveness has been a disadvantage of an air conditioning system with an absorption chiller heater due to a small capability for heat transportation and a large thermal capacity, it can be thus improved to a great extent.

Figure 9:
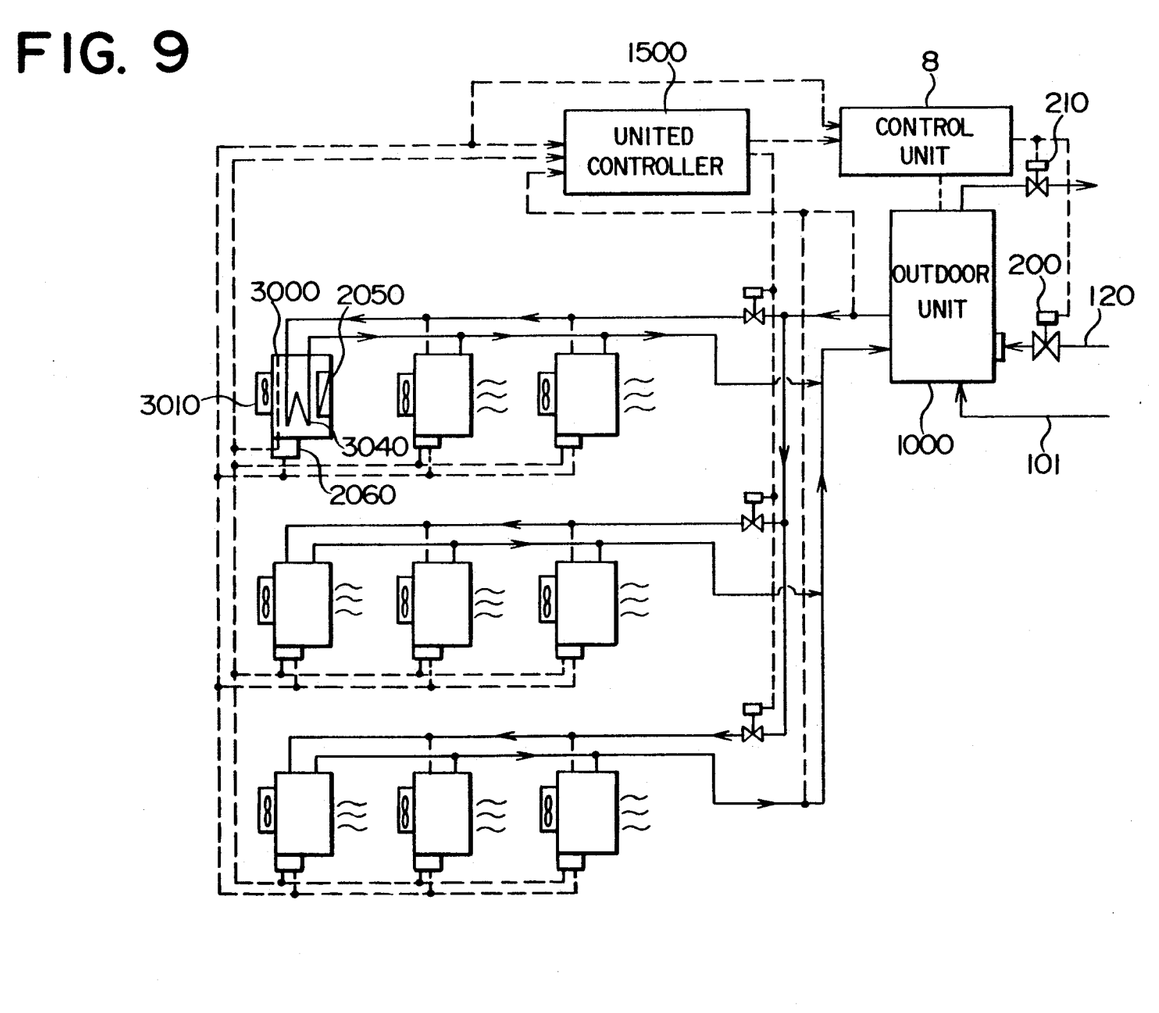
FIG. 9 is a schematic view of another embodiment of an unit-type air conditioning system according to the invention.

In the system shown in FIG. 4, a single cooling and heating air generator 2010 is provided in each secondary unit in order to convert chilled/hot water into cooling/heating air and to send it through the air duct 2030 to each terminal. However, the embodiment shown in FIG. 9 is different in that chilled/hot water is supplied as it is to each terminal load unit and converted into cooling/heating air by a heat exchanger 3040 of a cooling and heating air generator 3000 installed at the load unit. This cooling/heating air is supplied into the room by a fan 3010. Each cooling and heating air generator 3000 is controlled by manipulating an operation unit 2060 and operating an air capacity regulator 2050 in substantially the same manner as the embodiment of FIG. 4, and the operation and control of the entire system is also substantially the same as the embodiment of FIG. 4.

The above-described absorption chiller heater is a parallel-flow double-effect type. Needless to say, however, even if the chiller heater is a series-flow type in which a solution is supplied from the absorber 2 to the high temperature generator 5 where it is concentrated, and fed into the low temperature generator 4 where it is further concentrated, or even if it is a single-effect type, the invention is applicable and produces the same effects.

According to the present invention, an absorption chiller heater may be provided which can cover to a wide range of cooling and heating load changes, so that the heat efficiency will be less deteriorated at the time of a load change, and that the load responsiveness can be improved. Also, there can be realized an unit-type air conditioning system which enables low-load operation, has favorable load responsiveness, and is excellent in operational efficiency and economic effectiveness.

What is claimed is:

1. An absorption chiller heater comprising:
   a high temperature generator for heating a refrigerant absorbed by a solution to generate refrigerant vapor;
   a low temperature generator for concentrating a solution by use of said refrigerant vapor serving as a heat source so as to generate refrigerant vapor;
   a condenser for condensing the refrigerant vapor generated in said low temperature generator by use of cooling water;
   an evaporator including a conduit for introducing the refrigerant condensed in said condenser and the refrigerant condensed when used as the heat source in said low temperature generator, and a conduit for introducing the high-temperature refrigerant from said high temperature generator, said evaporator effecting heat exchanges of these refrigerants with chilled water and hot water;
   an absorber in which the refrigerants evaporated in said evaporator are absorbed by the solution supplied from said high temperature generator so as to dilute the solution and to return said solution to said high temperature generator;
   means for supplying said chilled water and hot water toward a load; and
   load responsive control means for effecting cooling and heating operation control by predicting a load change in dependence upon signals supplied from the load with respect to a room temperature, an air capacity of a fan, and an opening degree of a valve for regulating a flow rate of the chilled water and hot water.

2. An absorption chiller heater according to claim 1, wherein heating means in said high temperature generator includes a plurality of burners having individually controlled burning amounts and said control means controls the burning amounts of the respective burners to enable variable control of a heat output in accordance with the load.

3. An absorption chiller heater according to claim 1, wherein a refrigerant spray pump is provided for sprinkling a refrigerant over a heat transfer pipe in said evaporator, in which pipe chilled water and hot water flows, and a solution pump is provided for supplying the solution from said absorber to said high temperature generator, said spray and solution pumps being arranged in such a manner that inverter control of one or both of the spray and solution pumps enables control of rotational speed, so that said control means controls the heat output in accordance with the load by controlling the function of at least one of said refrigerant spray pump, said solution pump, and a control valve provided for regulating the flow rate of said cooling water.

4. An absorption chiller heater according to claim 3, wherein means are provided for detecting a temperature of said high temperature generator, a temperature of the cooling water at an outlet of said condenser, a temperature of said absorber, and a temperature of said evaporator, and wherein estimation means are provided for estimating concentrations of the solution from these temperatures, so that when the concentrations of the solution estimated by said estimation means exceed predetermined values, said control means control said refrigerant spray pump, and said control valve of the cooling water prior to said control in accordance with the load, in order to decrease said solution concentration.

5. An absorption chiller heater according to claim 4, wherein a refrigerant return valve is provided in a path for supplying the refrigerants from said low temperature generator and said condenser to said evaporator, said valve being adapted to feed said refrigerants directly to said absorber when said valve is open, and said control means opens said refrigerant return valve at a time of the operation stop, so as to at least one of stop said refrigerant spray pump or increase the rotational speed of said solution pump.

6. A unit-type air conditioning system comprising an absorption chiller heater according to claim 1, said absorption chiller heater forming an outdoor unit; at least one cooling and heating air generating means for enabling heat exchanges of chilled water and hot water, which is produced from said outdoor unit, with the air; and load units for supplying the air subjected to the heat exchange in said at least one cooling and heating air generation means.

7. An unit-type air conditioning system according to claim 6, wherein said cooling and heating air generation means each comprises a water flow control valve for regulating the flow rate of chilled water and hot water fed into and discharged from said cooling and heating air generation means, outlet and inlet temperature detection means for detecting an inlet temperature and an outlet temperature of said chilled water and hot water, a fan for blowing air out of said cooling and hot air generating means, and means for detecting a wind pressure at the outlet, and wherein said system further includes a controller for controlling said water flow control valves and said fans in accordance with detected values of said outlet and inlet temperatures and a detected value of said wind pressure.

8. An unit-type air conditioning system according to claim 7, wherein each of said load units comprises an operation unit, detection means for detecting a temperature in a room where said load is located, and an air valve for regulating an amount of air discharged from said load unit, and when commands of start, stop or change of cooling and heating are supplied from said operation units, said controller executes a control in accordance with said commands prior to said control based on the temperatures of chilled water and hot water and the wind pressure, and executes a control corresponding to a predicted value of a load change estimated in accordance with the detected values of said room temperatures, opening degrees of the air valves, and the number of the load units in operation, prior to said control based on the temperatures of chilled water and hot water and the wind pressure.

9. An unit-type air conditioning system according to claim 8, wherein when signals for the start, stop, or change of cooling and heating are supplied from said operation units, said load responsive type control means receive the signals and execute a priority control, and executes a priority control of said outdoor unit corresponding to a predicted value of a load change which is estimated from inputted information such as the detected values of room temperatures of the respective load units, the opening degree of the air valves, the opening degree of the water flow control valve in said respective cooling and heating air generation means, and the rotational speed of the fans.

* * * * *